March 17, 1959 C. O. BROWN 2,877,681
SCREW HAVING DEFORMABLE TEMPORARY HEAD DISPOSED IN A GROOVE
Filed April 16, 1954
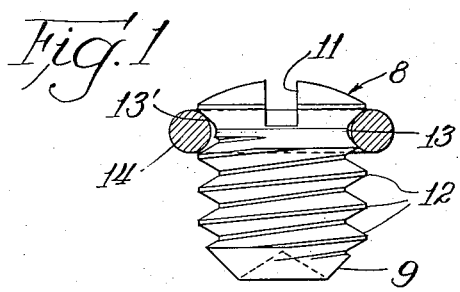
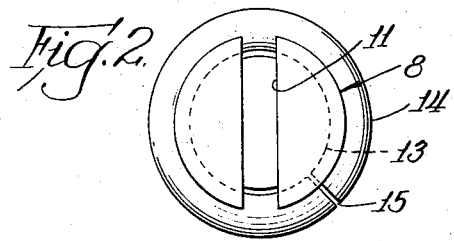
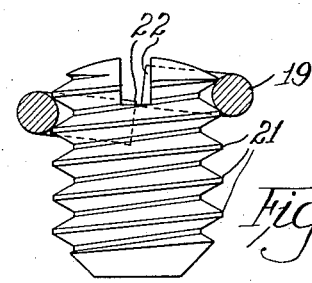
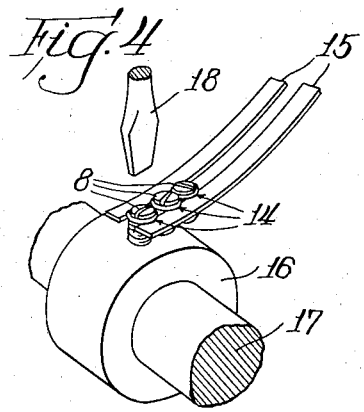
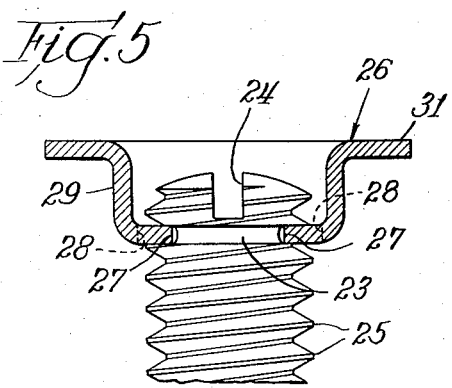
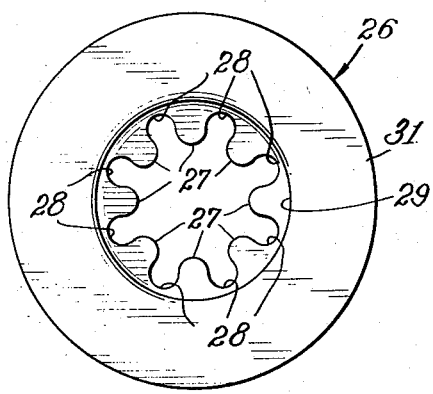
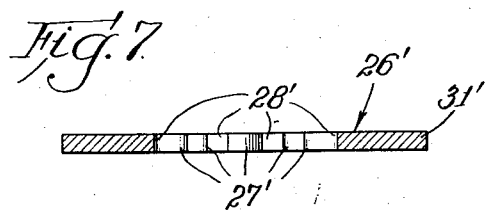
INVENTOR.
Calvin O. Brown
BY
John A. Watson
Atty.

United States Patent Office 2,877,681
Patented Mar. 17, 1959

2,877,681

SCREW HAVING DEFORMABLE TEMPORARY HEAD DISPOSED IN A GROOVE

Calvin O. Brown, Cary, Ill., assignor, by mesne assignments, to Set Screw & Mfg. Company, Bartlett, Ill., a corporation of Illinois Application April 16, 1954, Serial No. 423,604

4 Claims. (Cl. 85—9)

This invention pertains to screws, studs, screw blanks, pins and other devices that are to be fed automatically from a hopper or other source of supply in a predetermined orientation. The invention is particularly concerned with handling asymmetric but normally headless set screws, adjusting screws, studs and similar threaded articles but may be employed for screws and other articles whether or not they are asymmetric or completely "headless" where orientation of a plurality of like articles may be desired for any purpose.

Throughout the description and claims hereof the terms and expressions which are applied or used with reference to screw threads and products of various sorts employing threads, except as the context otherwise requires or as specifically indicated, are to be considered as having the meanings or definitions given in National Bureau of Standards Handbook H-28 (1944) entitled "Screw-Thread Standards for Federal Services, 1944," published (issued) February 17, 1945, by the United States Government Printing Office, Washington, D. C., see pages one to twenty-eight, inclusive, thereof in particular. However, it should be understood that it is not intended by the adoption and use of such meanings or definitions to restrict the invention as disclosed and claimed herein, to screw threads and threaded products approved or used by the United States Government or as listed in the aforesaid "handbook," since the invention is applicable to various screw threads and threaded products of both domestic and foreign design not embraced within the specifications or approval of the United States Government nor included in the said "handbook."

One of the primary objects of the invention is to provide a simple, inexpensive, effective and efficient means by which a headless or a substantially headless, longitudinally asymmetric element such as a set screw, an adjusting screw, stud or blank for such screw or stud, may be oriented in some desired or predetermined position as, for example, relative to others of its kind or to a place of use or other disposal, or to some other object with which it is to be combined.

Another primary object is to provide means that may serve as a temporary and readily removable "head" for an otherwise headless or substantially headless screw or other article such as mentioned above, whereby such article in large numbers and jumbled disorder may be fed automatically from a hopper or the like in ordered and oriented array to a place of use or disposal.

Still another important object is to provide a simple and effective method by which a temporary head on a normally headless and longitudinally asymmetric screw may be removed by the mere act of operating on the screw may be removed by moving it out of a suitable holding device into a place or device where the screw is to be received or by setting or placing the screw in a receiving device.

Many other objects as well as the advantages and uses of the invention will be understood after reading the description and claims and after viewing the drawings in which:

Fig. 1 is a view in side elevation of a headless set screw equipped with a temporary head or collar in a groove about one end, the head or collar being in the form of a substantially closed ring of spring wire but shown in section on a diameter of the ring;

Fig. 2 is a top plan view of the screw of Fig. 1 and its temporary ring head;

Fig. 3 is a view of another set screw of the normally "headless" type as the same may be equipped with a helical ring head disposed in the groove provided between adjacent flanks of adjacent turns of the screw thread, the ring being shown sectioned on a diameter; it may here be noted that a top plan view of the ring and screw of Fig. 3 would appear like the view of Fig. 2;

Fig. 4 is a schematic view illustrating a method by which normally headless screws with temporary heads of any of the types of those herein illustrated and described but particularly showing the type of Figs. 1 and 2, may be caused, with the aid of gravity and other influences, to drop into a slot or the like in predetermined orientation and to slide or flow in their oriented relationships to a place of disposal, the schematic view also illustrating one method by which to remove the temporary ring heads;

Fig. 5 is a side elevation of a portion of another normally headless set screw equipped with a special cup-shaped temporary head which is shown in section;

Fig. 6 is a plan view of the temporary head shown in Fig. 5, depicting the same as it would appear removed from the screw; and Fig. 7 is a sectional view, on a diameter, of still another temporary head ring of a type similar to that of Figs. 5 and 6 but being flat instead of cupped.

In the form illustrated in Figs. 1 and 2 the set screw, generally designated 8, has a cup-point 9 at one end and a diametric slot 11 across its other end. A thread, the turns of which are indicated at 12, extends substantially throughout the axial length of the screw and may be of any desired type, standard or non-standard. In this screw and thread root, pitch and crest diameters are substantially uniform throughout the thread length and no portion of the screw has a diameter greater than that of the thread crest. It is to be understood that the expression "longitudinally asymmetric" is intended to refer to a screw or other article which is not symmetrical with respect to a plane transverse or normal to the longitudinal axis of a set screw or other article. In other words by reason of the differences of the opposite ends (the slot and the cup) of the screw it may be defined as an axially asymmetric headless screw.

Either before, during or after the threading operation on the screw, that end portion which is adjacent to the slotted end is provided with a groove 13 that extends circumferentially about the screw body and is concentric with the screw thread axis. The diameter at the bottom of the groove 13 may be the same as the thread root diameter. Disposed in the groove 13 is a spring ring or the like 14, circular in cross-section in this embodiment, the ends 15 of which are brought into proximity to one another, preferably into close proximity as shown but, in most instances, at least to such degree that a plane tangent to the adjacent thread crest will intersect some part of each end part of the ring. The ring or annulus 14 will have a major diameter and such other dimensions, relative to the width of groove 13, and the maximum diameter of the screw, as will cause the ring to project radially outward beyond the maximum outward projection of the thread or other part of the screw circumferentially of the screw body while yet being retained in the groove 13.

Preferably the ring makes a friction fit in the groove although it may fit loosely but not so loosely as to permit the ring to be displaced accidentally from the groove. It is desirable that the ring characteristics be such that it may readily be sprung, either within or beyond the elastic limits of the metal or other material of which it is made, off of the screw end after it has served its purpose as a temporary head for the screw. The slope of that wall 13' of the grove 13 which faces away from the slotted end of the screw and the diameter of the rod or wire from which the ring may be made may have considerable effect on the ease with which the ring may be displaced from the screw in an axial direction.

In the schematic view of Fig. 4, one of the more important uses of the invention is portrayed. A pair of bars or ways 15 with their adjacent edges parallel and spaced apart a distance somewhat greater than any diameter of the threaded part of a screw 8 but less than the overall diameter of a head forming ring 14, may lead from a hopper or other source of supply of the temporarily headed screws. The ways 15 here terminate at a place where work such as the collar 16 with shaft 17 therethrough to be placed for reception of one or more screws. In this instance the collar has a threaded bore into which a screw 8 is to be received for securing the shaft and collar together.

Like or similar screws equipped with the temporary ring heads may be placed in heterogeneous array within a hopper from which their only manner of exit is in an oriented position as indicated in Fig. 4, with their cup points down and ring heads up. Any of a number of well known hoppers and hopper feeds may be employed if modified to accommodate these screws, as will be understood by those skilled in the art, to cause the screws to pass onto (and between) the ways 15 for gravity or force feed to their place of use or disposal. It has not been deemed necessary to illustrate any hopper feed mechanism since such mechanisms, per se, do not form part of the instant invention.

As a screw reaches a predetermined position such as that of the lowermost or left hand screw 8 in Fig. 4, where its depending end lies over and in register with the bore in the collar 16, a driving mechanism represented by the blade 18 of a power screw driver, may engage in the slot of the screw and either before or while rotating the screw may depress the screw toward the threaded bore so that the threads engage with one another. The downward movement of the screw relative to the ways 15 or the advance of the screw into the bore in the collar will force the ring head off of the screw end as will be understood. Of course a screw of the type under discussion may be placed by hand in the bore in the collar and driven therein, as by a screw driver, to such degree that the ring head encounters the wall margin about the bore and is sprung off of the screw as the screw continues to advance axially in the bore. The ring head is also very useful in handling the screws by the human hand, both in effecting orientation of the screw and in placing it where desired.

In the embodiment of Fig. 3, the head-forming ring 19 occupies the helical groove or valley between adjacent flanks of adjacent turns 21 of the screw thread so that while its ends 22 terminate adjacent to one another (360°, approximately, about the thread axis) they are off-set relative to one another to the extent of the lead of the thread. As in the earlier described form the temporary ring head projects radially outward beyond the thread crest throughout the circumference of the screw end and, preferably, will have such frictional engagement with the thread flanks as will prevent it from being displaced accidentally from the screw. The helical inclination of the ring 19 should not ordinarily cause difficulty in feeding such screw to or aligning such screw with a bore in which the screw is to be placed.

The screw of Fig. 5 has a circumferentially extending groove 23 that is concentric with the thread axis and is located below the bottom of the screw slot 24 where it cuts across the helix angle of the thread turns 25. The temporary ring head in this embodiment may be either the cup-shaped annulus 26 of Fig. 5 or the flat disc-like annulus 26' of Fig. 7, a top plan view of which would be similar to the showing of Fig. 6 except for the shading indicating the cup bowl. Each of the annuli 26 and 26' has a series of projections 27 and 27', respectively, which are directed radially inward for disposal within the groove 23 of the screw.

The radial lengths of the projections 27 and 27' and, of course, the corresponding radial depths of the recesses 28 and 28', respectively, which lie between the projections, preferably are such as to exceed the radial distance from the thread crest to the bottom of the groove 23 or to that portion of groove 23 against which a projection may engage, the purpose being to permit the projections to be bent down to clear the groove and thread when the head is being removed from the screw and to permit the head to be placed over the screw and the projections bent or forced into the groove when the screw is being "headed." The cup wall 29 of ring head 26 is of such height, in this embodiment, as to rise above the slotted end of the screw thereby to give the screw a greater effective length (of substantial advantage with small and short screws) and to provide a guide for a screw setting or driving tool. The outwardly projecting circumferential flanges 31 and 31' provide means by which the screw may be fed from a hopper or other source and in predetermined orientation as well as a means by which to facilitate manipulation by hand.

The invention, as will be appreciated, may be utilized for orienting, feeding and setting pins, screw blanks and other articles and is susceptible of many other embodiments and variations without departing from its essentials as may be delineated by the scope of the appended claims.

I claim:

1. A screw assembly for support and orientation by gravimetric methods, comprising a headless threaded screw the maximum diameter of which is the crest diameter of the thread and having one end provided with means for engagement by a torque applying tool, said screw having a groove formed therein, a readily deformable and removable temporary head forming member disposed in said groove and encircling said screw, said groove being positioned adjacent said one end whereby to place the center of gravity of said screw assembly between the head forming member and the other end of the screw, said head forming member having first portions extending radially inwardly and disposed in said groove to mount said head forming member thereon and having second portions extending radially outward of the thread crest to serve as a temporary head for support and orientation of said screw assembly, said first portions and said groove having cooperating cam surfaces for deforming said head forming member outwardly beyond the thread crest of said screw upon application of force therebetween longitudinally of said screw to cause automatic removal of said head forming member from said screw.

2. A screw assembly as set forth in claim 1, wherein the upper wall of the groove is inclined upwardly and outwardly to facilitate automatic expansion and removal of said temporary head member.

3. A screw assembly as set forth in claim 1, wherein the groove is a portion of a thread trough.

4. A screw assembly as set forth in claim 1, wherein the head forming member is a split ring member expandable for removal from the groove.

References Cited in the file of this patent

UNITED STATES PATENTS

| | | |
|---|---|---|
| 527,569 | Weisell | Oct. 16, 1894 |
| 1,299,691 | Dery | Apr. 8, 1919 |
| 1,920,792 | Hotchkin | Aug. 1, 1933 |
| 2,132,148 | Davis | Oct. 4, 1938 |
| 2,168,126 | Kane | Aug. 1, 1939 |
| 2,177,452 | Dempsey | Oct. 24, 1939 |
| 2,201,087 | Hallowell | May 14, 1940 |
| 2,335,367 | Thompson | Nov. 30, 1943 |
| 2,767,950 | Bellon | Oct. 23, 1956 |

FOREIGN PATENTS

| | | |
|---|---|---|
| 125,200 | Great Britain | Apr. 7, 1919 |
| 408,643 | Germany | Jan. 22, 1925 |